United States Patent [19]
Searby et al.

[11] Patent Number: 5,977,999
[45] Date of Patent: Nov. 2, 1999

[54] ELECTRONIC GRAPHIC APPARATUS WITH LOW DATA TRANSFER RATE BETWEEN DATA STORES

[75] Inventors: Anthony David Searby; Brian Robert Gordon Nonweiler, both of Newbury, United Kingdom

[73] Assignee: Quantel Limited, Newbury, United Kingdom

[21] Appl. No.: 08/195,519

[22] Filed: Feb. 14, 1994

Related U.S. Application Data

[63] Continuation of application No. 07/675,684, Mar. 27, 1991, abandoned.

[30] Foreign Application Priority Data

Mar. 28, 1990 [GB] United Kingdom .................. 9006870

[51] Int. Cl.⁶ .................................................. G06T 11/80
[52] U.S. Cl. ........................ 345/526; 345/509; 345/511
[58] Field of Search .................................. 395/155, 161, 395/164, 129, 511, 508, 509, 526; 345/179, 118, 121, 185, 170, 429, 511, 508, 509, 526

[56] References Cited

U.S. PATENT DOCUMENTS

| | | | |
|---|---|---|---|
| 4,514,818 | 4/1985 | Walker | 395/129 |
| 4,688,190 | 8/1987 | Bechtolschem | 395/164 X |
| 4,786,897 | 11/1988 | Takanashi et al. | 345/121 X |
| 4,816,815 | 3/1989 | Yoshida | 345/508 |
| 4,931,956 | 6/1990 | Stapleton | 364/521 |
| 5,018,078 | 5/1991 | Urabe et al. | 395/164 |
| 5,020,003 | 5/1991 | Moshenberg | 395/164 |
| 5,043,919 | 8/1991 | Callaway et al. | 395/164 X |
| 5,058,041 | 10/1991 | Rose et al. | 395/164 |
| 5,107,251 | 4/1992 | Frank et al. | 345/185 |

FOREIGN PATENT DOCUMENTS

| | | | |
|---|---|---|---|
| 0202014 | 11/1986 | European Pat. Off. | G06F 15/64 |
| 0117327 | 6/1985 | Japan | 395/164 |
| 0144824 | 7/1985 | Japan | 395/164 |
| 2231471 | 11/1990 | United Kingdom . | |
| 2235356 | 2/1991 | United Kingdom . | |
| 2235856 | 3/1991 | United Kingdom . | |

OTHER PUBLICATIONS

Clark et al., "Distributed Processing in a High–Performance Smart Image Memory", Lambda, Fourth Quarter 1980, pp. 40–45.

Primary Examiner—Mark K. Zimmerman
Attorney, Agent, or Firm—Cooper & Dunham LLP

[57] ABSTRACT

A video graphics system is provided with a framestore 3 and a viewing store 10. The framestore 3 is arranged to receive new image data created by a processor 6 in response to user manipulations of a stylus/touch tablet device 1. The framestore 3 and the viewing store 10 both have the capacity to store a high definition image and to facilitate display of the image on a high definition monitor 13 the framestore is arranged to transfer only portions of its data contents to the viewing store 10 during a frame period. The portion transferred is determined by the position of the stylus on the touch tablet at the beginning of a frame period. Data in the viewing store 10 is output in faster sequence for display on the monitor 13.

30 Claims, 2 Drawing Sheets

ELECTRONIC GRAPHIC APPARATUS WITH LOW DATA TRANSFER RATE BETWEEN DATA STORES

This is a continuation of application Ser. No. 07/675,684 filed Mar. 27, 1991, now abandoned.

FIELD OF THE INVENTION

The present invention relates to an electronic graphic apparatus and to a method of processing an image.

BACKGROUND OF THE INVENTION

One example of an electronic graphic apparatus or system is described in our British Patent No. 2 089 625 and corresponding U.S. Pat. No. 4,514,818. This system includes a touch tablet and stylus combination for generating position signals designating the position of the stylus relative to the touch tablet. The user or operator paints or draws (hereinafter referred to simply as "paints") by selecting a color and a so called brush distribution from a range of predefined color and distribution functions. Movement of the stylus relative to the touch tablet causes the generation of a series of position signals. The system also includes a pixel processing circuit and a frame storage means which can store an array of pixels representing a picture. On moving the stylus to designate different positions, a patch of pixels in the frame storage means referenced by each designated position is modified in response to the selected color and distribution. All the pixels in the frame storage means, representing the picture, can moreover be read repeatedly and applied to a monitor to display the picture as it is built up by the operator.

The frame storage means for a system such as referred to in the preceding paragraph requires three ports, one for reading back pixels from the frame storage means to the processing circuit, one for writing the modified pixels from the processing circuit into the frame storage means and the third for repeatedly reading the pixels from the frame storage means to the monitor for display. Serial access is sufficient for reading the pixels as a video signal to the monitor, but random access is required via the first and second ports.

These requirements make it difficult to transfer pixels to the monitor at high rates, such as would be needed for example to refresh a monitor displaying a picture of high definition, say HDTV standard.

One object of the present invention is to reduce this difficulty.

SUMMARY OF THE INVENTION

According to one aspect of the present invention there is provided graphic apparatus comprising: an image store for manipulation in a framestore, the framestore being arranged such that user determined manipulations to the image data are effected at a rate corresponding to a low resolution and a portion of the image data including the manipulated data is output from time to time to a display store containing data representing the image for display, the area of output data updating a corresponding area of data in the display store.

According to another aspect of the invention there is provided a method of processing an image, the method comprising: storing in an image store having a multiplicity of storage locations data representing a multiplicity of pixels which together from the image; identifying a position in the image: addressing a path of storage locations in the image store determined by the identified position; processing data at the addressed storage locations in order to effect a modification to the image represented by the data in the image store at the identified position, said processing being at a rate corresponding to a low resolution image; storing in a display store having a multiplicity of storage locations data representing a multiplicity of pixels which together form the image of high resolution for display; addressing a large number of adjacent storage locations in said image store containing pixels which together represent a part of the image including the identified position; addressing corresponding storage locations in said display store; and updating the addressed locations in the display store with pixel data from corresponding addressed locations in said image store, and causing the addressed locations in the display store; and reading data from said display store and producing a sequence of signals adapted for the reproduction of the image represented by the read data.

The above and further features of the invention are set forth with particularity in the appended claims and together with advantages thereof will become clearer from consideration of the following detailed description of an exemplary embodiment of the invention given with reference to the accompanying drawings.

BRIEF DESCRIPTIONS OF THE DRAWINGS

In the drawings, FIG. 1 is a schematic diagram representing a video graphics system embodying the invention; and FIG. 2 is a schematic diagram illustrating the manner in which image data is transferred in the system of FIG. 1.

DETAILED DESCRIPTION OF AN EMBODIMENT OF THE INVENTION

Figure 1:
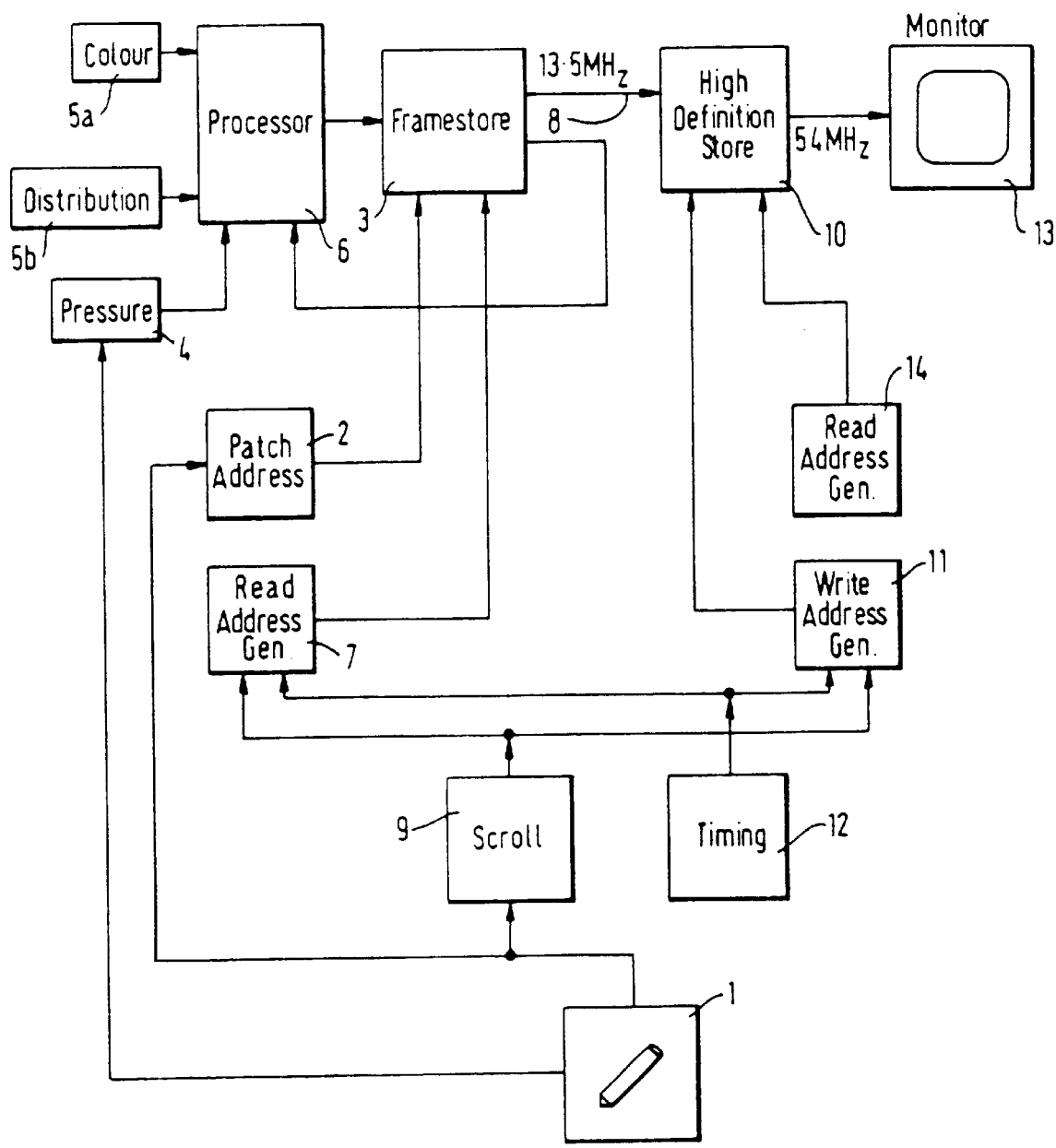

Referring now to FIG. 1 of the accompanying drawings, there is shown an electronic graphic apparatus or system comprising a stylus/touch tablet combination 1 which is arranged such that as the stylus is drawn across the touch tablet, signals XY representing the instantaneous position of the stylus on the touch tablet are output. The XY signals are applied to a patch address generator 2.

Picture point data representing an image is stored in a framestore 3 and for each XY position of the stylus, the patch address generator 2 generates, serially, a patch of picture point addresses in the framestore 3, which patch of addresses is related to the XY position of the stylus.

In addition to generating XY signals, the stylus/touch tablet combination may be arranged to generate date representing the pressure applied via the stylus to the touch tablet, such pressure related data being stored in a pressure register 4. Notional drawing implements are used to draw image data into the framestore 3 and data representing the distribution of a selected drawing implement is held in a distribution store 5a. Similarly, data representing a user selected colour is held in a colour register or store 5b.

The distribution register or store 5a is arranged to provide a distribution signal for each picture point in the patch in the framestore 3 addressed by the generator 2. During painting each addressed picture point is read from the framestore 3 and applied to a processor 6. The processor 6, which may be of the kind described in our above mentioned patents, receives also the colour and distribution data from the respective stores 5a and 5b. The processor 6 is responsive to the pressure exerted on the stylus by the operator as represented by the pressure data in the pressure registers and uses the colour and distribution data to modify each pixel in the currently identified patch, the resulting modified pixel data being written back to their respective locations in the framestore 3. In this way pixel data representing a picture can be created in the framestore 3, or data therein can be touched up, or otherwise processed as described in the aforementioned patents.

In the exemplary system shown in FIG. 1, the framestore 3 is formed from four normal television standard three-port framestore devices which are combined to form an enlarged storage field having four quadrants, one quadrant for each of the framestore devices. Thus, the framestore 3 has the capacity to store pixel data representing up to four pictures at the resolution of the normal television standard, for example 625 lines, or to store one picture at four times normal resolution, for example HDTV standard.

A read address generator 7 generates addresses to enable the reading of pixels serially from an area in the framestore 3 sufficient to accommodate one picture at normal television resolution, which pixels are output from the framestore 3 via an output bus 8. A scroll data generator 9 also receives the XY signals from the touch tablet 1 and is arranged to generate data that causes the read address generator 7 to shift, horizontally and vertically, the area corresponding to the picture which is read from the framestore 3 to cause the area to occupy a desired position in the enlarged storage field. Thus, whilst the framestore 3 has the capacity to store an image in an enlarged storage field, the read address generator 7 is arranged to generate addresses such that only an area corresponding to an image at normal TV resolution is read from the framestore 3 during a frame period. The exact rate at which data is read from the framestore 3 will of course depend on external influences such as the standards adopted in the country in which the system is to be used, but by way of example the address generator 7 will typically generate addresses such that pixels are read from the area in the framestore 3 at a rate of say 13.5 MHz.

The picture point data or pixels read from the framestore 3 are applied to a high definition viewing store 10 which has the capacity to store pixels representing a picture of high resolution relative to the normal television standard mentioned above, for example HDTV standard. The pixels read from the framestore 3 are addressed to picture points in the viewing store 10 under the control of an address generator 11. The operation of both the read address generator 7 and the write address generator 11 is controlled by a timing circuit 12. The address generator 11 at any one time addresses only an area of the viewing store 10 occupying approximately one quarter of the storage field of this store. That is to say, the write address generator 11 addresses an area in the viewing store 11 which area is defined by a number of pixels corresponding to that in the picture read from the framestore 3. The write address generator 11 also receives scrolling data from the scroll data generator 9 and thus the address data generated by the read address generator 7 and the write address generator 11 is coordinated so that the area in the viewing store 10 to which pixel data is written tracks the area in the framestore 3 from which the reading of pixel data occurs.

The areas in the framestore 3 and the viewing store 10 are determined by the position of the stylus on the touch tablet at the beginning of each frame period, ie area reading cycle. The stylus can designate any position in the framestore 3, that is to say it can generate signals that designate any address in any of the four three-port framestore devices. At the beginning of each frame period the current address designated by the stylus is used by the scroll data generator 9 to identify the mid point of the areas in both the framestore 3 and the viewing store 10. Once the mid point has been identified the areas remain stationary until the reading cycle is completed ie until the end of the frame period and at the beginning of the next frame period. The areas are then moved by the scroll data generator 9 to the new current stylus position. As successive picture points in the viewing store 10 are addressed, the corresponding pixels output from the framestore 3 are written into the viewing store as that picture point.

A high definition read address generator 14 is arranged to generate read addresses to cause the reading of pixels from the high definition viewing store 10 for display of the high definition image on a high definition monitor 13.

Figure 2:
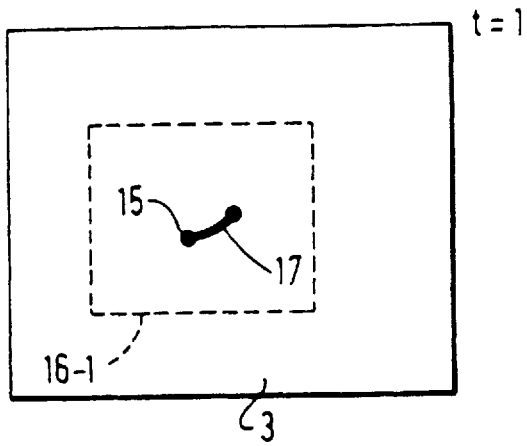
Figure 2:
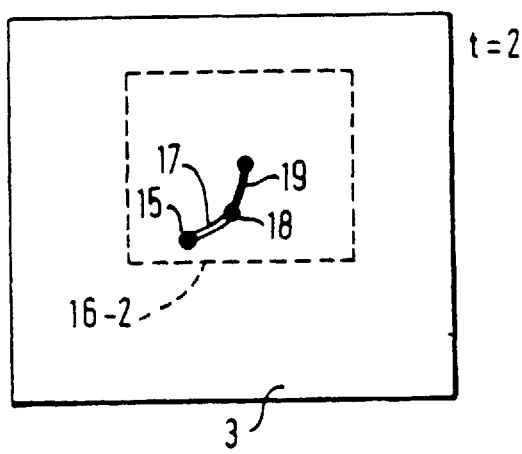
Figure 2:
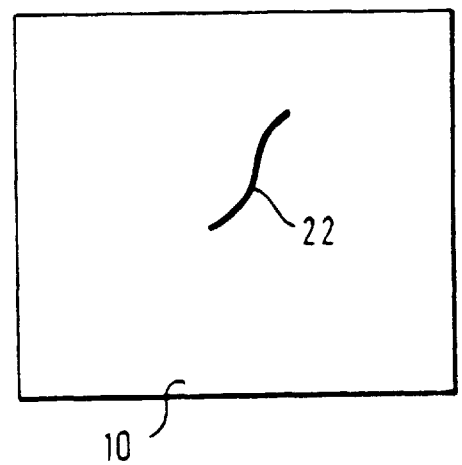
Figure 2:
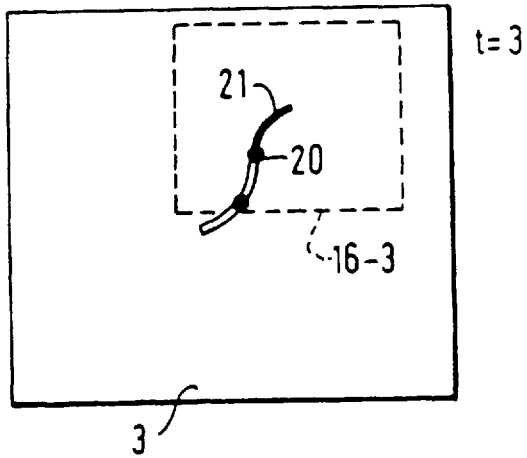

FIG. 2 of the accompanying drawings illustrates the way in which the position of the area addressed by the read address generator 7 changes from frame period to frame period. When the stylus is brought into contact with the touch tablet the address in the framestore 3 corresponding to the point 15 is identified and this point is used to define the centre of the area, as represented by the broken line 16-1. Movement of the stylus on the touch tablet causes data representing the stroke 17 to be drawn into the store by the processor (see FIG. 1) and at the same time data is read from the area 16-1 to the corresponding area of the viewing store 10 replacing the data previously in that area. At the beginning of the next frame period t=2, the point 18 is identified as the next centre of the next area 16-2. During this next frame period t=2 data is read from the area 16-2 to a new corresponding area of the viewing store 10 replacing the data previously in that area. At the same time, further movement of the stylus results in the stroke 19 being drawn into the framestore 3. During the next frame period t=3 the point 20 is identified as the centre of the area 16-3, and during creation of a stroke 21, data in the area 16-3 is written to its corresponding area in the viewing store 10. This process is repeated during each frame period with the image gradually being built up in the framestore 3 and transferred in the manner described to the viewing store 10. At the end of the fourth frame period, in the example given in FIG. 2, data representing the line 22 will be held in the viewing store 10 for display on the monitor 13.

It will thus be appreciated that painting into the framestore 3 is done in the normal way by random access read-modify-write operations at normal TV rates, eg 13.5 MHz, and a portion of the image data including the modified data is transferred to the viewing store 10 also at that rate for display at high definition TV rates, eg 54 MHz. The portion or area of the image that is transferred is always centred on the position of the stylus at the beginning of a frame period and the area is sufficiently large to ensure that no normal movement of the stylus in the ensuing frame period will carry the stylus outside the defined area.

Returning now to FIG. 1, it should be noted that the viewing store 10 is a two port store and it may comprise suitable Random Access Memory (RAM) devices such as a video RAM having a serial output. There is no need to provide a random access output to read from the viewing store 10. The serial output that provides the video data to the monitor 13 can therefore be rapid enough to refresh the high definition monitor 13 at the rates associated with high definition television. Thus reading may be effected to provide definition at 54 MHz for example. Indeed the monitor 13 may even be an HDTV monitor capable of accepting a video waveform at 74.25 MHz, and a definition of this order can be achieved by providing the stores 3 and 10 with sufficient picture point capacity to accommodate six images at the normal television definition.

The number of pixels in the two stores 3 and 10 need not correspond and a digital filter may be included in the bus 8, to compress the picture if the number of pixels in store 3 exceeds that in store 10, or to expand the picture if the situation is reversed.

It will be appreciated that in the example described, when painting is being effected, the updating of the picture in the store 10 is carried out within an area which moves with the stylus, the area being centred periodically (at the frame rate) at the current position of the stylus, so that updating is carried out at the area of picture within which the operator is working. For other operations, or for picture composition effects, it may be desirable to update the entire picture in the store 10 from time to time. Updating in store 10 can then be effected in four passes, occupying four frame periods and covering respectively the four quadrants of the picture.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

We claim:

1. An electronic graphic apparatus for displaying high definition images, comprising:
   an image store having a multiplicity of storage locations for storing image data representing a multiplicity of pixels which together form an image of a size determined by the multiplicity of pixels;
   a user operable input device for inputting position data, said position data identifying a succession of positions in said image store;
   a first addressing circuit for addressing successive patches of storage locations in said image store, said first addressing circuit being responsive to said user operable input device such that said addressing is determined by said succession of positions identified by said position data;
   a processor for processing said image data at each patch of storage locations addressed by said first addressing circuit in order to effect a modification to said image represented by said image data and for storing said processed image data in said image store at said patch of storage locations, said processing being performed during a frame period;
   a display store having a multiplicity of storage locations for storing display data representing a multiplicity of pixels which together form a display image of substantially the same size as that of the image in said image store, said display data stored in said display store representing substantially the same image as that represented by said image data stored in the image store;
   a second addressing circuit for addressing an area of storage locations in said image store from which image data is read, said area including said patches of storage locations storing said processed image data, and for addressing a corresponding area of storage locations in said display store, said area in the image store and said corresponding area in the display store being of a predetermined fixed size less than the size of the image and determined by the position identified by said position data input by the input device at the beginning of the frame period, so as to write said processed image data read from said addressed area of storage locations in said image store to said corresponding storage locations in said addressed area in said display store, wherein the addressing of said area of storage locations in said image store and said corresponding area of storage locations in said display store is at a rate sufficient to transfer all data in said area of predetermined fixed size between said image store and said display store in a frame period, which rate is less than a display rate so that said addressing of said areas occupies said frame period, and so that said display data in said corresponding area in said display store is updated during said frame period with data from said addressed area of the image store including said processed image data so as to effect a modification to said image displayed during succeeding frame periods immediately following said frame period, said modification to said display image corresponding to the modification effected during said frame period to said image represented by said image data; and
   a reading circuit for reading said display data in said display store at said display rate for output and display of said image represented thereby during said frame period.

2. An electronic graphic apparatus as claimed in claim 1, wherein said user operable input device comprises a stylus and touch tablet device.

3. An electronic graphic apparatus as claimed in claim 2, wherein the stylus and touch tablet device comprises a pressure sensor for providing pressure data representing instantaneous pressure applied by the stylus to the touch tablet and wherein the processor processes said data at said addressed patch of storage locations in dependence on said pressure data.

4. An electronic graphic apparatus as claimed in claim 1, wherein said processor processes said data at said patch of storage locations in the image store addressed by the first addressing circuit by reading data from the patch of storage locations in the image store, modifying said read data to create modified data and writing said modified data to said addressed patch of storage locations to replace said data previously stored therein.

5. An electronic graphic apparatus as claimed in claim 4, further comprising a store for storing color data representing a user selected color and for storing distribution data representing a drawing implement, the processor modifying the read data by the color data and the distribution data.

6. An electronic graphic apparatus as claimed in claim 1, wherein the second addressing circuit comprises a read address generator for generating addresses identifying each of the storage locations comprising said area of storage locations in the image store and a write address generator for generating addresses identifying each of the storage locations comprising said corresponding area of storage locations in the display store.

7. An electronic graphic apparatus as claimed in claim 6, wherein the storage locations in both the image store and the display store are arranged in an array with each location being addressable in terms of a horizontal and a vertical component, and the second addressing circuit comprises a scroll data generator for generating data, with the read address generator and the write address generator both being responsive to said data from the scroll data generator such that said addresses generated by the read address generator and the write address generator scroll horizontally and vertically through storage locations in the image store and the display store.

8. An electronic graphic apparatus as claimed in claim 7, wherein the scroll data generator is responsive to said position data to generate scroll data for causing said read address generator and said write address generator to generate addresses such that said area of storage locations in the image store and said corresponding area of storage locations in the display store changes in accordance with changes in the position identified by the position data.

9. An electronic graphic apparatus as claimed in claim 1, wherein the second addressing circuit is arranged such that said portion of said image is centered over said position identified by said position data.

10. An electronic graphic apparatus as claimed in claim 1, further comprising a monitor for receiving said data output by said reading circuit and for displaying the image represented thereby.

11. A method of processing an image for high resolution display, the method comprising:
  storing in an image store having a multiplicity of storage locations, image data representing a multiplicity of pixels which together form the image of a size determined by the multiplicity of pixels;
  identifying a succession of positions in said image store;
  addressing successive patches of storage locations in said image store, said successive patches of storage location being determined at least partially by said identified positions;
  processing image data at each addressed patch of storage locations in order to effect a modification to the image represented by said image data and storing said processed image data in said image store at said addressed storage locations during a frame period;
  storing in a display store having a multiplicity of storage locations, display data representing a multiplicity of pixels which together form a display image of substantially the same size as that of the image in said image store, said display data stored in said display store representing substantially the same image as that represented by said image data stored in said image store;
  reading said display data in said display store at a display rate for output and display of the image represented thereby during said frame period;
  addressing an area of storage locations in said image store from which image data is to be read, said area including said patches of storage locations storing said processed image data;
  addressing a corresponding area of storage locations in said display store to which at least processed image data is to be written, said area in said image store and said corresponding area in said display store being of a predetermined fixed size less than the size of the image and determined by said position identified at the beginning of said frame period; and
  writing said processed image data read from said area of addressed storage locations in said image store to said corresponding storage locations in said addressed area in said display store, wherein the addressing of said area of storage locations in said image store and said corresponding area of storage locations in said display store is at a rate sufficient to transfer all data in said area of predetermined fixed size between said image store and said display store in a frame period, which rate is less than said display rate so that said addressing of said areas occupies said frame period, and so that said display data in said corresponding area in said display store is updated during said frame period with said processed image data so as to effect a modification to said image displayed during succeeding frame periods immediately following said frame period.

12. The method as claimed in claim 11, wherein said step of processing is effected by reading data from the addressed patch of storage locations in the image store and modifying the read data to create modified data to the addressed patch of storage locations to replace the data previously stored therein.

13. The method as claimed in claim 12, further comprising the steps of:
  selecting a color and storing color data representative thereof;
  storing distribution data representing a drawing implement; and
  modifying the read data by the color data and the distribution data.

14. The method as claim in claim 11, further comprising the step of changing the addressing of said area of storage locations in said image store and said corresponding area of storage locations in said display store in response to changes in the identified position.

15. The method as claimed in claim 11, wherein the steps of addressing an area of storage locations in the image store and addressing a corresponding area of storage locations in the display store are such that said portion of the image is centered over the position identified by the position data.

16. The method as claimed in claim 11, further comprising the step of displaying the image represented by said data read from said display store.

17. An electronic graphic apparatus for displaying high resolution images, comprising:
  a display store having a multiplicity of storage locations for storing display data representing a multiplicity of pixels which together form a display image of a size determined by the multiplicity of pixels;
  a first display store addressing circuit for reading at a predetermined rate related to a frame period said display data stored in said display store;
  an image store having a multiplicity of storage locations for storing image data representing a multiplicity of pixels which together form an image that is of substantially the same size as that of the display image in said display store and is substantially the same image as that represented by said display data stored in said display store;
  user operable device for inputting position data identifying positions in said image store;
  an image store addressing circuit responsive to said user operable device and operable at a rate lower than said predetermined rate, and configured to address selected patches of addresses in said image store related to said positions identified by said position data, said selected patches of addresses each containing a patch of said image data for processing, and said image store addressing circuit is configured to address an area of addresses in said image store including said selected patches of addresses for subsequent reading of said image data after processing;
  a processor for processing said patches of said image data addressed by said image store addressing circuit in order to effect a modification to said image represented by said image data, and for storing said processed patches of image data in said image store at respective areas of said selected patches of addresses, said processing being performed during said frame period at said lower rate; and
  a second display store addressing circuit for addressing an area of addresses in said display store corresponding to said area of addresses addressed in said image store having said processed image data stored therein, said area in said image store and said corresponding area in said display store being of a predetermined fixed size less than the size of the image and said second display store addressing circuit being operatively connected to said image store addressing circuit;

a controller for controlling said image store addressing circuit and said second display store addressing circuit in response to said position data input by said user operable device at the beginning of said frame period so that said area of said display store addressed by said second display store addressing circuit tracks said selected patches of addresses addressed by said image store addressing circuit, such that said processed patches of image data are transferred at said lower rate from said area of addresses addressed in said image store to said corresponding addressed area in said display store in said frame period, wherein said lower rate is sufficient to transfer all data in said area of predetermined fixed size between said image store and said display store in a frame period.

18. An electronic graphic apparatus as claimed in claim 17, wherein the user operable input device comprises a stylus and touch tablet device.

19. An electronic graphic apparatus as claimed in claim 18, wherein the stylus and touch tablet device comprises a pressure sensor for providing pressure data representing instantaneous pressure applied by the stylus to the touch tablet, the processor processing said data at said addressed patch of storage locations in dependence on said pressure data.

20. An electronic graphic apparatus as claimed in claim 17, wherein said processor processes said data at said patch of storage locations in the image store addressed by the image store addressing circuit by reading data from the patch of storage locations in the image store, modifying said read data to create modified data and writing said modified data to said addressed patch of storage locations to replace said data previously stored therein.

21. An electronic graphic apparatus as claimed in claim 20, further comprising memory for storing color data representing a user selected color and for storing distribution data representing a drawing implement, the processor modifying the read data by the color data and the distribution data.

22. An electronic graphic apparatus as claimed in claim 17, wherein the storage locations in both the image store and the display store are arranged in an array with each location being addressable in terms of a horizontal and a vertical component, the apparatus further comprising a scroll data generator for generating data, the image store addressing circuit and the second display store addressing circuit both being responsive to said data from the scroll data generator such that the addresses generated by the image store addressing circuit and the second display store addressing circuit scroll horizontally and vertically through storage locations in the image store and the display store.

23. An electronic graphic apparatus as claimed in claim 22, wherein the scroll data generator is responsive to said position data to generate scroll data for causing said image store addressing circuit and said second display store addressing circuit to generate addresses such that said portion of the image changes in accordance with changes in the position identified by the position data.

24. An electronic graphic apparatus as claimed in claim 23, wherein the image store addressing circuit and the second display store addressing circuit are arranged such that said portion of the image is centered over said position identified by said position data.

25. An electronic graphic apparatus as claimed in claim 17, further comprising a monitor for receiving data read by said first display store addressing circuit and for displaying the image represented by the received data.

26. A method of processing an image for high definition display, the method comprising:

storing display data in a display store having a multiplicity of storage locations, said display data representing a multiplicity of pixels which together form a display image of a size determined by the multiplicity of pixels;

reading at a predetermined rate related to a display frame period said display data stored in said display store for display;

storing image data in an image store having a multiplicity of storage locations, said image data representing a multiplicity of pixels which together form an image that is of substantially the same size as that of the display image in said display store and is substantially the same image as that represented by said display data stored in the display store;

inputting position data identifying positions in said image store;

addressing at a rate lower than said predetermined rate, selected patches of addresses in said image store related to said positions identified by said position data, said selected patches of addresses each containing a patch of said image data for processing;

processing said patches of said image data in order to effect a modification to said image represented by said image data, said processing being performed at said lower rate;

addressing at said lower rate an area of addresses in said image store including said selected patches of addresses having said processed patches of image data for transfer to said display store;

addressing an area of addresses in said display store corresponding to said area of addresses addressed in said image store for storing said processed patch of image data, said area in said image store and said corresponding area in said display store being of a predetermined fixed size less than the size of the image; and controlling said image store addressing and said display store addressing in response to said position data input at the beginning of said frame period so that said addressed area of said display store tracks said area of addresses addressed by said image store addressing circuit and so that said area of image data including processed patches is transferred at said lower rate from said image store to said corresponding addressed area in said display store in said frame period, wherein said lower rate is sufficient to transfer all data in said area of predetermined fixed size between said image store and said display store in a frame period.

27. An electronic graphic apparatus for displaying high definition images, comprising:

an image store having a multiplicity of storage locations for storing image data representing a multiplicity of pixels which together form an image of a size determined by the multiplicity of pixels;

a user operable input device for inputting position data, said position data identifying a succession of positions in said image store;

a first addressing circuit for addressing successive patches of storage locations in said image store, said first addressing circuit being responsive to said user operable input device such that said addressing is determined by said succession of positions identified by said position data;

a processor for processing said image data at each patch of storage locations addressed by said first addressing circuit in order to effect a modification to said image represented by said image data and for storing said processed image data in said image store at said patch of storage locations, said processing being performed during a frame period;

a display store having a number of storage locations equal to said multiplicity of storage locations of said image store, for storing display data representing a multiplicity of pixels which together form a display image of substantially the same size as that of the image in said image store, said display data stored in said display store representing substantially the same image as that represented by said image data stored in the image store;

a second addressing circuit for addressing an area of storage locations in said image store from which image data is read, said area including said patches of storage locations storing said processed image data, and for addressing a corresponding area of storage locations in said display store, said area in the image store and said corresponding area in the display store being of a predetermined fixed size less than the size of the image and determined by the position identified by said position data input by the input device at the beginning of the frame period, so as to write said processed image data read from said addressed area of storage locations in said image store to said corresponding storage locations in said addressed area in said display store, wherein the addressing of said area of storage locations in said image store and said corresponding area of storage locations in said display store is at a rate sufficient to transfer all data in said area of predetermined fixed size between said image store and said display store in a frame period, which rate is less than a display rate so that said addressing of said areas occupies said frame period, and so that said display data in said corresponding area in said display store is updated during said frame period with data from said addressed area of the image store including said processed image data so as to effect a modification to said image displayed during succeeding frame periods immediately following said frame period, said modification to said display image corresponding to the modification effected during said frame period to said image represented by said image data; and a reading circuit for reading said display data in said display store at said display rate for output and display of said image represented thereby during said frame period.

28. A method of processing an image for high resolution display, the method comprising:

storing in an image store having a multiplicity of storage locations, image data representing a multiplicity of pixels which together form the image of a size determined by the multiplicity of pixels;

identifying a succession of positions in said image store;

addressing successive patches of storage locations in said image store, said successive patches of storage location being determined at least partially by said identified positions;

processing image data at each addressed patch of storage locations in order to effect a modification to the image represented by said image data and storing said processed image data in said image store at said addressed storage locations during a frame period;

storing in a display store having a number of storage locations equal to said multiplicity of storage locations of said image store, display data representing a multiplicity of pixels which together form a display image of substantially the same size as that of the image in said image store, said display data stored in said display store representing substantially the same image as that represented by said image data stored in said image store;

reading said display data in said display store at a display rate for output and display of the image represented thereby during said frame period;

addressing an area of storage locations in said image store from which image data is to be read, said area including said patches of storage locations storing said processed image data;

addressing a corresponding area of storage locations in said display store to which at least processed image data is to be written, said area in said image store and said corresponding area in said display store being of a predetermined fixed size less than the size of the image and determined by said position identified at the beginning of said frame period; and writing said processed image data read from said area of addressed storage locations in said image store to said corresponding storage locations in said addressed area in said display store, wherein the addressing of said area of storage locations in said image store and said corresponding area of storage locations in said display store is at a rate sufficient to transfer all data in said area of predetermined fixed size between said image store and said display store in a frame period, which rate is less than said display rate so that said addressing of said areas occupies said frame period, and so that said display data in said corresponding area in said display store is updated during said frame period with said processed image data so as to effect a modification to said image displayed during succeeding frame periods immediately following said frame period.

29. An electronic graphic apparatus for displaying high resolution images, comprising:

a display store having a multiplicity of storage locations for storing display data representing a multiplicity of pixels which together form a display image of a size determined by the multiplicity of pixels;

a first display store addressing circuit for reading at a predetermined rate related to a frame period said display data stored in said display store;

an image store having a number of storage locations equal to said multiplicity of storage locations of said display store, for storing image data representing a multiplicity of pixels which together form an image that is of substantially the same size as that of the display image in said display store and is substantially the same image as that represented by said display data stored in said display store;

user operable device for inputting position data identifying positions in said image store;

an image store addressing circuit responsive to said user operable device and operable at a rate lower than said predetermined rate, and configured to address selected patches of addresses in said image store related to said positions identified by said position data, said selected patches of addresses each containing a patch of said image data for processing, and said image store addressing circuit is configured to address an area of addresses in said image store including said selected patches of addresses for subsequent reading of said image data after processing;

a processor for processing said patches of said image data addressed by said image store addressing circuit in order to effect a modification to said image represented by said image data, and for storing said processed patches of image data in said image store at respective areas of said selected patches of addresses, said processing being performed during said frame period at said lower rate; and a second display store addressing circuit for addressing an area of addresses in said display store corresponding to said area of addresses addressed in said image store having said processed image data stored therein, said area in said image store and said corresponding area in said display store being of a predetermined fixed size less than the size of the image and said second display store addressing circuit being operatively connected to said image store addressing circuit;

a controller for controlling said image store addressing circuit and said second display store addressing circuit in response to said position data input by said user operable device at the beginning of said frame period so that said area of said display store addressed by said second display store addressing circuit tracks said selected patches of addresses addressed by said image store addressing circuit, such that said processed patches of image data are transferred at said lower rate from said area of addresses addressed in said image store to said corresponding addressed area in said display store in said frame period, wherein said lower rate is sufficient to transfer all data in said area of predetermined fixed size between said image store and said display store in a frame period.

30. A method of processing an image for high definition display, the method comprising:

storing data in a display store having a multiplicity of storage locations, said display data representing a multiplicity of pixels which together form a display image of a size determined by the multiplicity of pixels;

reading at a predetermined rate related to a display frame period said display data stored in said display store for display;

storing image data in an image store having a number of storage locations equal to said multiplicity of said display store, said image data representing a multiplicity of pixels which together form an image that is of substantially the same size as that of the display image in said display store and is substantially the same image as that represented by display data stored in the display store;

inputting position data identifying positions in said image store;

addressing at a rate lower than said predetermined rate, selected patches of addresses in said image store related to said positions identified by said position data, said selected patches of addresses each containing a patch of said image data for processing;

processing said patches of said image data in order to effect a modification to said image represented by said image data, said processing being performed at said lower rate;

addressing at said lower rate an area of addresses in said image store including said selected patches of addresses having said processed patches of image data for transfer to said display store;

addressing an area of addresses in said display store corresponding to said area of addresses addressed in said image store for storing said processed patch of image data, said area in said image store and said corresponding area in said display store being of a predetermined fixed size less than the size of the image and; and controlling said image store addressing and said display store addressing in response to said position data input at the beginning of said frame period so that said addressed area of said display store tracks said area of addresses addressed by said image store addressing circuit and so that said area of image data including processed patches is transferred at said lower rate from said image store to said corresponding addressed area in said display store in said frame period, wherein said lower rate is sufficient to transfer all data in said area of predetermined fixed size between said image store and said display store in a frame period.

* * * * *